(12) United States Patent
Nakamura et al.

(10) Patent No.: US 7,485,244 B2
(45) Date of Patent: *Feb. 3, 2009

(54) INTERNAL ELECTRODE PASTE AND PRODUCTION METHOD OF ELECTRONIC DEVICE

(75) Inventors: Tomoko Nakamura, Chuo-ku (JP); Shigeki Satou, Chuo-ku (JP)

(73) Assignee: TDK Corporation, Tokyo (JP)

( * ) Notice: Subject to any disclaimer, the term of this patent is extended or adjusted under 35 U.S.C. 154(b) by 591 days.

This patent is subject to a terminal disclaimer.

(21) Appl. No.: 10/549,515

(22) PCT Filed: Mar. 25, 2004

(86) PCT No.: PCT/JP2004/004178

§ 371 (c)(1), (2), (4) Date: Sep. 20, 2005

(87) PCT Pub. No.: WO2004/088675

PCT Pub. Date: Oct. 14, 2004

(65) Prior Publication Data

US 2006/0197062 A1  Sep. 7, 2006

(30) Foreign Application Priority Data

Mar. 31, 2003  (JP) ............................. 2003-095628

(51) Int. Cl.
*H01B 1/22* (2006.01)
*B05D 5/12* (2006.01)

(52) U.S. Cl. .................. 252/512; 252/514; 427/96; 427/118

(58) Field of Classification Search ......... 252/512–514; 427/58, 96, 118, 79
See application file for complete search history.

(56) References Cited

U.S. PATENT DOCUMENTS 6,494,931 B1 * 12/2002 Mukuno et al. ............... 75/255
2001/0018116 A1 * 8/2001 Hayashi et al. ............. 428/209

FOREIGN PATENT DOCUMENTS

| JP | A 62-117201 | 5/1987 |
| JP | A 3-83311 | 4/1991 |
| JP | A 3-250612 | 11/1991 |
| JP | A 7-312326 | 11/1995 |
| JP | A 9-282941 | 10/1997 |
| JP | A 10-67567 | 3/1998 |
| JP | A 11-293186 | 10/1999 |
| JP | A 11-354374 | 12/1999 |
| JP | A 2000-76930 | 3/2000 |
| JP | A-2002-043161 | 2/2002 |

* cited by examiner

*Primary Examiner*—Mark Kopec
(74) *Attorney, Agent, or Firm*—Oliff & Berridge, PLC

(57) ABSTRACT

An internal electrode paste comprises electrode material powder, a binder resin containing a polyvinyl butyral resin as the main component, and a solvent. The internal electrode paste furthermore comprises a plasticizer, and the plasticizer is contained by 25 parts by weight or more and 150 parts by weight or less with respect to 100 parts by weight of the binder resin. The binder resin is contained by 2.5 to 5.5 parts by weight with respect to 100 parts by weight of the electrode material powder. It is possible to provide an internal electrode paste having enough strength and an adhesive force for the dry transfer method, and a production method of an electronic device using the paste.

6 Claims, 10 Drawing Sheets

FIG. 8
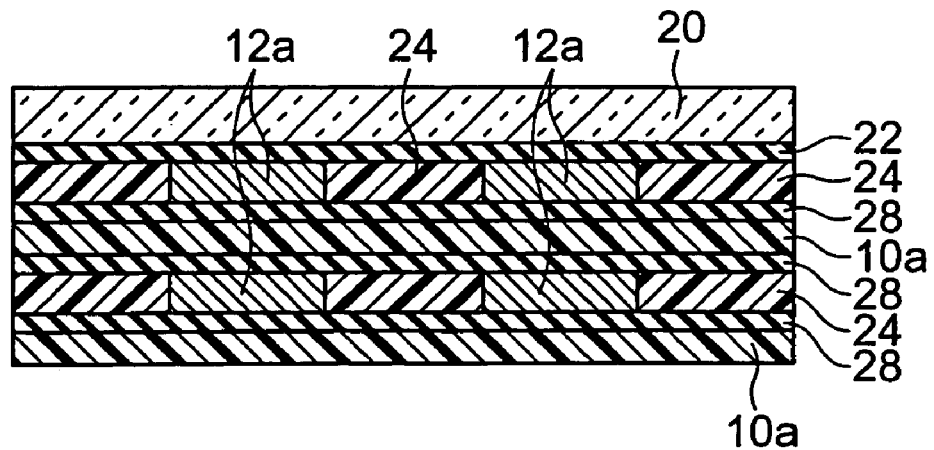
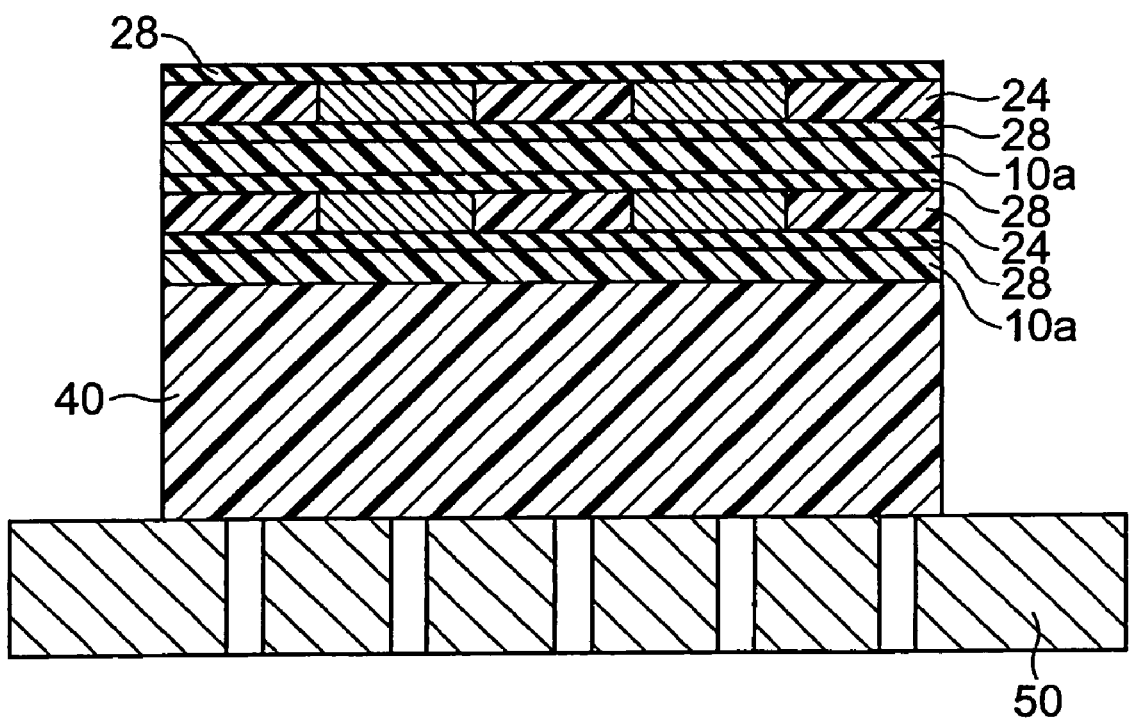

INTERNAL ELECTRODE PASTE AND PRODUCTION METHOD OF ELECTRONIC DEVICE

TECHNICAL FIELD

The present invention relates to a production method of an electronic device having an internal electrode, such as a multilayer ceramic capacitor, and an internal electrode paste used in the production method, and particularly relates to an internal electrode paste having enough strength and adhesive force to enable dry transfer of an internal electrode and a production method of an electronic device using the same.

BACKGROUND ART

In recent years, as a variety of electronic equipments become compact, electronic devices to be installed inside the electronic equipments have become more compact and higher in performance. As one of the electronic devices, there is a ceramic electronic device, such as a CR built-in substrate and a multilayer ceramic capacitor, and the ceramic electronic devices have been required to be more compact and higher in performance.

To pursue a more compact ceramic electronic device having a higher capacity, there is a strong demand for making a dielectric layer thinner. Recently, a thickness of a dielectric green sheet composing a dielectric layer has become a several μm or less.

To produce a ceramic green sheet, normally, a ceramic paste composed of ceramic powder, a binder (an acrylic resin and butyral based resin, etc.), a plasticizer (phthalate esters, glycols, adipic acids, and phosphoric esters) and an organic solvent (toluene, MEK and acetone, etc.) is prepared. Next, the ceramic paste is applied to a carrier sheet (a supporting body made by PET or PP) by the doctor blade method, etc., heated and dried to produce.

Also, a method of producing by preparing a ceramic suspension wherein the ceramic powder and binder are mixed in a solvent, then, extruding by twin-screw a film-shaped molded item obtained by molding the suspension has been considered in recent years.

A method of producing a multilayer ceramic capacitor by using the ceramic green sheet explained above will be explained in detail. An internal electrode conductive paste containing electrode material powder and a binder is printed to be a predetermined pattern on the ceramic green sheet and dried to form an internal electrode pattern. After that, the green sheet is peeled from the carrier sheet and stacked by a predetermined number of layers. Here, two methods are proposed, that are a method of peeling the green sheet from the carrier sheet before stacking in layers and a method of peeling the carrier sheet after stacking in layers and adhering by compression, but the difference is not large. Finally, the stacked body is cut to be chips, so that green chips are prepared. After firing the green chips, external electrodes are formed, so that electronic devices, such as multilayer ceramic capacitors, are produced.

When producing a multilayer ceramic capacitor, an interlayer thickness of sheets formed with internal electrodes is in a range of 3 μm to 100 μm or so based on a desired capacitance required as a capacitor. Also, in a multilayer ceramic capacitor, a part not formed with internal electrodes is formed on an outer part in the stacking direction of the capacitor chip.

In such a multilayer ceramic capacitor, it was general that a binder used in the green sheet paste was a polyvinyl butyral resin having a polymerization degree of 1000 or less (Mw=50,000) (refer to the Japanese Patent Publication No. 10-67567). As the reasons, to sufficiently secure adhesiveness of ceramic green sheets at the time of stacking, to reduce surface roughness of the green sheets, to secure plasticity of the green sheets, and to reduce viscosity of slurry may be mentioned. As a plasticizer, generally, phthalic acid, adipic acid, sebacic acid, and phosphoric esters can be used, which were selected in terms of a boiling point and hazardous property, etc. for the purpose of giving plasticity.

In recent years, as electronic equipments become more compact, electronic devices to be used therein have rapidly become more compact. In multilayer electronic devices as typified by a multilayer ceramic capacitor, rapid development has been made on increasing the number of layers to be stacked and attaining a thinner interlayer thickness. To respond to the technical trends, a thickness of a green sheet, which determines the interlayer thickness, has almost become 3 μm or less to 2 μm or less. Also, along therewith, a thickness of the internal electrode layer has become 1.5 μm or less, and the number of layers to be stacked has almost become 300 or more.

To form an internal electrode on such a thin green sheet, when using the conventional printing method, there arises a problem of so called sheet-attack that a solvent included in an internal electrode paste melts the green sheet. Thus, the dry transfer method has been developed.

In the dry transfer method, first, a release layer is formed on a PET film as a supporting sheet and an internal electrode layer is printed thereon. Furthermore, to eliminate a level difference due to a thickness of the internal electrode layer, a blank pattern layer having the same thickness as that of the internal electrode layer is formed on a blank pattern portion where an electrode is not formed.

A resin layer (adhesive layer) having adhesiveness is formed on a different PET film from the PET film formed with the internal electrode layer, and transferred to the internal electrode layer and the blank pattern layer by thermocompression bonding. Then, the PET film on the resin layer side is removed.

A dielectric green sheet is formed on a still other PET film and transferred to the resin layer by heat transfer.

In this way, a release layer and an electrode are unified with the blank pattern layer, the resin layer and the green sheet, and the result is stacked successively, consequently, stacking of thin film sheets with no sheet-attack becomes possible.

A thickness of 0.1 μm or less of an adhesive layer used in the dry transfer method is effective to prevent delamination during the binder burnout. A butyral based resin is extremely effective to obtain sufficient strength and adhesive force even in the case of such an extremely thin layer.

An internal electrode paste used in the conventional printing method is often composed of an ethyl cellulose based resin, metal powder and a solvent. However, since ethyl cellulose based resins were poor in strength and adhesiveness, there was a problem that electrode layer breaking and an adhesive defect were easily caused in the dry transfer method.

On the other hand, to make a chip capacitor to be more compact and have a larger capacity, an electrode layer has to be made thin and smooth as well as thinning a dielectric layer.

Since metal weight per one layer becomes light as the electrode becomes thinner, a metal adhering amount has to be less when forming an internal electrode layer by the printing method. It is advantageous in terms of procedure costs to decrease the metal adhering amount by lowering a metal content in the print paste in a conventional facility. However, when the solvent ratio is made high to lower the metal ratio, the paste viscosity abruptly declines and it becomes impossible for a conventional printing facility to deal with.

Also, to improve smoothness of the internal electrode layer after firing, it is efficient to make the metal filling density high in the internal electrode layer at the stage of green. To make the metal filling rate high, an amount of other component, for example a binder resin, may be decreased. However, when the binder resin is decreased, the paste viscosity declines, so that it is necessary to use a binder having high viscosity.

DISCLOSURE OF THE INVENTION

The present invention was made in consideration of the above circumstances, and an object thereof is to provide an internal electrode paste having enough strength and an adhesive force to perform dry transfer of an internal electrode, and being capable of improving the metal filling rate and smoothness of an internal electrode layer, and a production method of an electronic device using the same.

To attain the above object, an internal electrode paste according to the present invention comprises electrode material powder, a binder resin containing a polyvinyl butyral resin and/or a polyvinyl acetal resin as the main component, and a solvent.

The internal electrode paste of the present invention may contain other additives in addition to the electrode material powder, binder resin and solvent.

In the case of forming an extremely thin internal electrode, when using a conventionally general ethyl cellulose based resin as a binder resin of an internal electrode paste, an internal electrode layer formed after drying the paste has a poor adhesive force and transfer of an adhesive layer becomes very difficult. Also, even when the adhesive layer can be adhered, because of the poor strength, the internal electrode layer is easily damaged when peeling the PET film as a supporting sheet.

In the present invention, as a result that a polyvinyl butyral resin and/or a polyvinyl acetal resin is included in the internal electrode paste, the internal electrode layer formed by the paste has high strength and a high adhesive force, and transfer of an adhesive layer is relatively easy. Also, breaking of the internal electrode layer is hard to be caused at the time of peeling the PET film as a supporting sheet.

The internal electrode paste of the present invention further contains a plasticizer, and the plasticizer is contained by 25 parts by weight or more and 150 parts by weight or less with respect to 100 parts by weight of the binder resin. By adding a plasticizer, a release force of the PET film as a supporting sheet declines and a releasing operation becomes easy. To obtain such an effect, an adding quantity of the plasticizer is preferably 25 parts by weight or more. Note that when the adding quantity exceeds 150 parts by weight, an excessive plasticizer exudes from the internal electrode layer formed by using the paste, which is not preferable.

A plasticizer able to be used in the internal electrode paste of the present invention is not particularly limited and preferably dioctyl adipic acid (DOA), butyl phthalate butylene glycol (BPBG), didodecyl phthalate (DDP), dibutyl phthalate (DBP), benzylbutyl phthalate (BBP), dioctyl phthalate (DOP) and dibutyl sebacate, etc. may be mentioned.

Preferably, the electrode material powder is contained by 50 wt % or less, more preferably less than 50 wt %, and particularly preferably 48 wt % or less with respect to the entire internal electrode paste. For example, by lowering the content of the electrode material powder from 50 wt % to 45 wt %, a thickness of the internal electrode can become thinner by about 10% as far as an adhering amount as a paste is the same, which contributes to make the layer thinner. Note that when the content of the electrode material powder is too small, the paste viscosity abruptly declines, so that the content of the electrode material powder is preferably 40 wt % or more, and more preferably 43 wt % or more.

When the ratio of a solvent is made high to lower the content of the electrode material powder in the internal electrode paste, the paste viscosity declines and a problem of blur, etc. is easily caused when printing by using the paste. To maintain necessary viscosity while keeping the binder resin amount constant by making the solvent ratio high, it is efficient to use a resin having high viscosity.

In the present invention, a polyvinyl butyral resin and/or polyvinyl acetal resin is used as a binder resin. There are a variety of grades in these resins. In the present invention, by selecting a polyvinyl butyral resin and/or polyvinyl acetal resin having a polymerization degree of 1400 or more, it is possible to maintain necessary viscosity even when the solvent ratio is made high. Note that a polymerization degree of a generally produced polyvinyl butyral resin and/or polyvinyl acetal resin is 3600 or less. Accordingly, a preferable polymerization degree of the polyvinyl butyral resin and/or polyvinyl acetal resin is 1400 to 3600. Note that the polymerization degree of the polyvinyl butyral resin and/or polyvinyl acetal resin may be 3600 or more.

In the present invention, a polyvinyl acetal resin is particularly preferable. It is because it has higher viscosity at same polymerization degree comparing with that of a polyvinyl butyral resin. Note that in a polyvinyl acetal resin, when the acetalization degree is made high, the viscosity becomes high but dry density tends to decline.

An acetalization degree of a generally produced polyvinyl acetal resin is 50 to 74 mol % or so. In the present invention, the acetalization degree of the polyvinyl acetal resin is preferably 74 mol % or less, and more preferably 66 mol % or less. When the acetalization degree becomes high, the dry density tends to decline, and continuity and smoothness of electrodes deteriorate after firing. Note that the lower the acetalization degree is, the more preferable, and the lower limit may be 50 mol % or less.

Preferably, the binder resin is contained by 2.5 to 5.5 parts by weight with respect to 100 parts by weight of the electrode material powder.

Preferably, ceramic powder is furthermore contained. The ceramic powder is contained preferably by 1 to 20 wt %, and more preferably 2 to 15 wt % with respect to the entire paste. When the ceramic powder is too little, it is liable that matching of a dielectric layer and an electrode layer is hard to be attained at the time of firing and delamination is easily caused. While when it is too much, smoothness and continuity of electrodes are hindered.

In the case where the ceramic powder is contained in the paste, the binder resin is preferable contained by 2.5 to 5.5 parts by weight with respect to a total of 100 parts by weight of the electrode material powder and ceramic powder.

By lowering the binder resin ratio in the internal electrode paste, the metal filling density of the internal electrode layer before firing becomes high, and smoothness of the internal electrode layer can be maintained after firing. Accordingly, an amount of the binder resin is preferably 5.5 parts by weight or less with respect to 100 parts by weight of pigment (electrode material powder and ceramic powder). Note that when the binder resin is too little, the strength declines and breaking of an internal electrode layer and other trouble arise in the dry transfer method. To obtain sufficient strength to perform the dry transfer method, a binder resin of 2.5 parts by weight or more is necessary with respect to 100 parts by weight of the pigment. Note that the pigment is a combination of the electrode material powder and ceramic powder when the ceramic powder is contained in addition to the electrode material powder in the paste, and when the ceramic powder is not contained, it only indicates the electrode material powder.

A production method of an electronic device according to the present invention comprises the steps of:

preparing the internal electrode paste as set forth in any one-of the above;

forming a green sheet;

forming an internal electrode layer by using the internal electrode layer paste;

stacking the green sheets via internal electrode layers to obtain a green chip; and firing the green chip.

Also, a production method of an electronic device of the present invention comprises the steps of:

forming an electrode layer on a surface of a first supporting sheet by using the internal electrode paste as set forth in any one of the above,;

pressing the electrode layer against a surface of a green sheet, and adhering the electrode layer to the surface of the green sheet;

stacking the green sheet adhered with the electrode layer to form a green chip; and firing the green chip.

Preferably, a binder resin included in the green sheet paste for forming the green sheet contains a polyvinyl butyral resin, and a polymerization degree of the polyvinyl butyral resin is 1000 or higher and 1700 or lower, a butyralation degree of the resin is higher than 64 mol % and lower than 78 mol %, and the residual acetyl group amount is less than 6 mol %.

When the polymerization degree of-the polyvinyl butyral resin is too low in the green sheet paste, it is liable that sufficient mechanical strength as a green sheet is hard to be obtained when making the layer thin. While, when the polymerization degree is too high, the surface roughness declines when made to be a sheet. Also, when a butyralation degree of the polyvinyl butyral resin is too low, solubility to the paste tends to decline, while when too high, the sheet surface roughness tends to deteriorate. Furthermore, when a residual acetyl group amount is too large, the sheet surface roughness tends to decline.

In the production method of an electronic device of the present invention, the internal electrode paste of the present invention preferably contains the same kind of a binder resin as the binder resin contained in a paste for forming a green sheet to be, for example, a dielectric layer and a magnetic body layer after firing. This is the same in the case of using an acrylic resin as a binder resin of the green sheet paste. By using the same kind of binder resin, control of conditions in a binder removal step, etc. become easy.

BRIEF DESCRIPTION OF DRAWINGS

Below, the present invention will be explained based on embodiments shown in drawings.

FIG. 4A to FIG. 4C, FIG. 5A to FIG. 5C, FIG. 6A to FIG. 6C, FIG. 7 and FIG. 8 are sectional views of a key part showing a stacking method of a green sheet on which an electrode layer is adhered.

BEST MODE FOR CARRYING OUT THE INVENTION

First, as an embodiment of an electronic device produced according to the present invention, an overall configuration of a multilayer ceramic capacitor will be explained.

Figure 1:
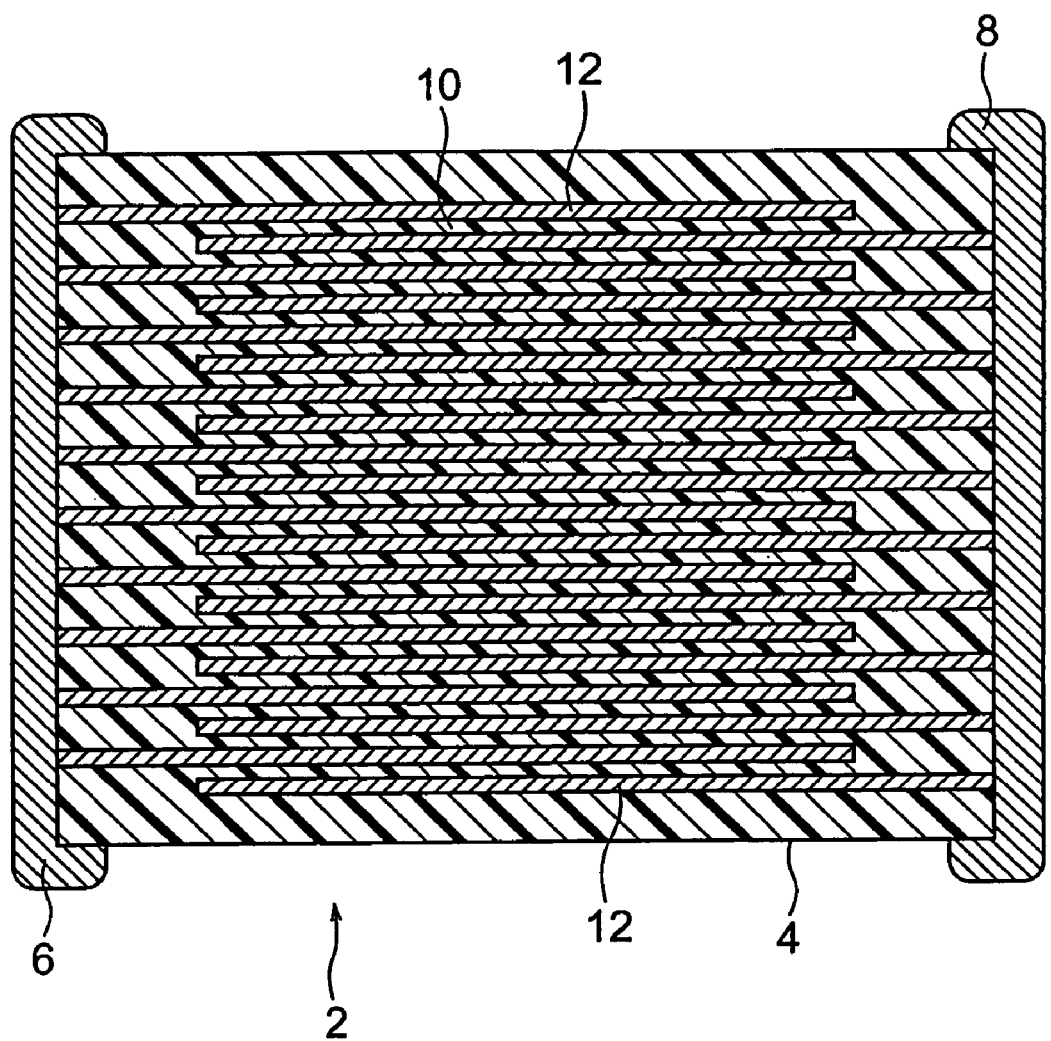
FIG. 1 is a schematic sectional view of a multilayer ceramic capacitor as an embodiment of the present invention.

As shown in FIG. 1, a multilayer ceramic capacitor 2 according to the present embodiment comprises a capacitor element 4, a first terminal electrode 6 and a second terminal electrode 8. The capacitor element 4 comprises dielectric layers 10 and internal electrode layers 12, and the internal electrode layers 12 are stacked alternately between the dielectric layers 10. The alternately stacked internal electrode layers 12 on one side are electrically connected to inside of the first terminal electrode 6 formed outside of one end portion of the capacitor element 4. Also, the alternately stacked internal electrode layers 12 on the other side are electrically connected to inside of the second terminal electrode 8 formed outside of the other end portion of the capacitor element 4.

In the present embodiment, an internal electrode layer 12 is formed by transferring an electrode layer 12a to a ceramic green sheet 10a as shown in FIG. 2 to FIG. 6 as will be explained later on.

A material of the dielectric layer 10 is not particularly limited and composed of a dielectric material, for example, calcium titanate, strontium titanate and/or barium titanate, etc. A thickness of each of the dielectric layers 10 is not particularly limited, but those having a thickness of several μm to several hundreds of μm are general. Particularly in the present embodiment, it is made to be thin as preferably 5 μm or less, more preferably 3 μm or less, and particularly preferably 1.5 μm or less. Also, the internal electrode layer 12 is made to be thin as preferably 1.5 μm or less, more preferably 1.2 μm or less, and particularly preferably 1.0 μm or less.

A material of the terminal electrodes 6 and 8 is not particularly limited, either, and copper, a copper alloy, nickel and a nickel alloy, etc. are normally used. Silver and an alloy of silver with palladium may be also used. A thickness of the terminal electrodes 6 and 8 is not particularly limited, either, but is normally 10 to 50 μm or so.

A shape and size of the multilayer ceramic capacitor 2 may be suitably determined in accordance with the object and use. When the multilayer ceramic capacitor 2 has a rectangular parallelepiped shape, it is normally a length (0.6 to 5.6 mm, preferably 0.6 to 3.2 mm)×width (0.3 to 5.0 mm, preferably 0.3 to 1.6 mm)×thickness (0.1 to 1.9 mm, preferably 0.3 to 1.6 mm) or so.

Next, an example of production methods of the multilayer ceramic capacitor 2 according to the present embodiment will be explained.

(1) First, a dielectric paste (green sheet paste) is prepared to produce a ceramic green sheet for composing the dielectric layers 10 shown in FIG. 1 after firing.

The dielectric paste is composed of an organic solvent based paste obtained by kneading a dielectric material (ceramic powder) and an organic vehicle.

The dielectric material is suitably selected from a variety of compounds which become composite oxides or oxides, such as carbonates, nitrites, hydroxides, and organic metal compounds, and mixed for use. The dielectric material is normally used as powder having an average particle diameter of 0.4 μm or less, and preferably 0.1 to 0.3 μm or less. Note that it is preferable to use finer powder than the green sheet thickness to form an extremely thin green sheet.

A binder used for the organic vehicle is not particularly limited and a variety of normal binders, such as ethyl cellulose, polyvinyl butyral and an acrylic resin, may be used, but a polyvinyl butyral resin is used in the present embodiment. A polymerization degree of the polyvinyl butyral resin is 1000 or higher and 1700 or lower, and preferably 1400 to 1700. Also, a butyralation degree of the resin is 64 mol % or higher and 78 mol % or lower, and preferably 64 mol % or higher and 70 mol % or lower, and the residual acetyl group amount is less than 6 mol % and preferably 3 mol % or less.

An organic solvent to be used for an organic vehicle is not particularly limited and an organic solvent, such as terpineol, butyl carbitol, acetone and toluene, etc. is used.

In the present invention, a dielectric paste may be also generated by kneading a dielectric material and a vehicle obtained by dissolving a water-soluble binder in water.

The water-soluble binder is not particularly limited and polyvinyl alcohol, methyl cellulose, hydroxyethyl cellulose, a water-soluble acrylic resin and emulsion, etc. are used.

A content of each component in the dielectric paste is not particularly limited and the dielectric paste can be fabricated to contain a solvent of, for example, about 1 wt % to about 50 wt %.

In the dielectric paste, additives selected from a variety of dispersants, plasticizers, dielectrics, subcomponent compounds, glass flit, and insulators may be included in accordance with need. When adding these additives, in the dielectric paste the total content is preferably about 10 wt % or less. When using a butyral based resin as a binder resin, a content of a plasticizer is preferably about 25 to about 100 parts by weight with respect to 100 parts by weight of the binder resin. When the plasticizer is too much, the plasticizer exudes and it becomes difficult to handle, which is not preferable.

Figure 3A:
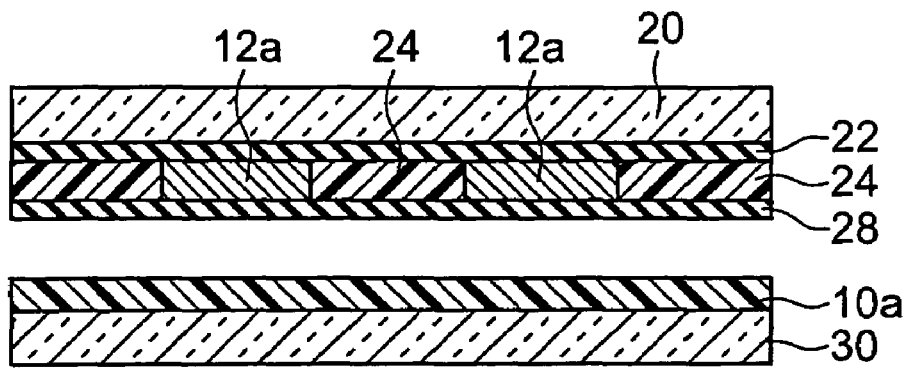

By using the dielectric paste, for example as shown in FIG. 3A, a green sheet 10a is formed to be a thickness of preferably 0.5 to 30 μm, and more preferably 0.5 to 10 μm or so on the carrier sheet 30 as a second supporting sheet by the doctor blade method, etc. The green sheet 10a is dried after being formed on the carrier sheet 30. Temperature of drying the green sheet 10a is preferably 50 to 100° C. and drying time is preferably 1 to 20 minutes. A thickness of the green sheet 10a after drying is contracted to 5 to 25% of that before drying. The thickness of the green sheet after drying is preferably 3 μm or less.

Figure 2A:
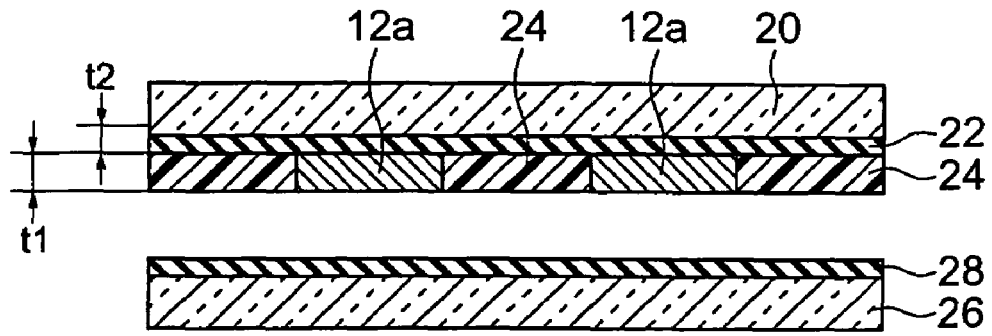
FIG. 2A to FIG. 2C and FIG. 3A to FIG. 3C are sectional views of a key part showing a transfer method of an electrode layer.

(2) As shown in FIG. 2A, a carrier sheet 20 as a first supporting sheet is prepared separately from the above carrier sheet 30, and a release layer 22 is formed thereon and, on top thereof, an electrode layer 12a having a predetermined pattern is formed. On a surface of the release layer 22 where the electrode layer 12a is not formed, a blank pattern layer 24 having substantially the same thickness as that of the electrode layer 12a is formed.

As the carrier sheets 20 and 30, for example, a PET film, etc. is used, and those coated with silicon, etc. are preferable to improve the release property. Thicknesses of the carrier sheets 20 and 30 are not particularly limited and are preferably 5 to 100 μm. The thicknesses of the carrier sheets 20 and 30 may be same or different.

The release layer 22 preferably contains the same dielectric powder as the dielectric composing the green sheet 10a shown in FIG. 3A. Also, the release layer 22 contains a binder, a plasticizer and a release agent other than the dielectric powder. A particle diameter of the dielectric powder may be the same as that of the dielectric particles included in the green sheet but it is preferable to be smaller.

In the present embodiment, a thickness t2 of the release layer 22 is preferably not more than a thickness of the electrode layer 12a, and more preferably, it is set to be a thickness of 60% or less, and further preferably 30% or less.

A method of applying the release layer 22 is not particularly limited, but it has to be formed to be extremely thin, so that an applying method using, for example, a wire bar coater or a die coater is preferable. Note that adjustment of the release layer thickness can be made by selecting a wire bar coater having a different wire diameter. Namely, to make the thickness of the release layer to be applied thinner, it can be done by selecting one having a small wire diameter, inversely, to form it thick, one with a large wire diameter may be selected. The release layer 22 is dried after being applied. The drying temperature is preferably 50 to 100° C. and the drying time is preferably 1 to 10 minutes.

A binder for the release layer 22 is composed, for example, of an acrylic resin, polyvinyl butyral, polyvinyl acetal, polyvinyl alcohol, polyolefin, polyurethane, polystyrene, or an organic composed of a copolymer of these or emulsion. The binder contained in the release layer 22 may be the same as the binder contained in the green sheet 10a or may be different from that, but preferably the same.

A plasticizer for the release layer 22 is not particularly limited and, for example, phthalate ester, dioctyl phthalate, adipic acid, phosphate ester and glycols, etc. may be mentioned. The plasticizer to be contained in the release layer 22 may be the same as that contained in the green sheet 10a or may be different from that.

A release agent for the release layer 22 is not particularly limited and, for example, paraffin, wax and silicone oil, etc. may be mentioned. A release agent contained in the release layer 22 may be the same as that contained in the green sheet 10a or may be different from that.

A binder is contained in the release layer 22 by preferably 2.5 to 200 parts by weight, more preferably 5 to 30 parts by weight, and particularly preferably 8 to 30 parts by weight or so with respect to 100 parts by weight of dielectric particle.

A plasticizer is preferably contained in the release layer 22 by 0 to 200 parts by weight, preferably 20 to 200 parts by weight, and more preferably 50 to 100 parts by weight with respect to 100 parts by weight of the binder.

A release agent is preferably contained in the release layer 22 by 0 to 100 parts by weight, preferably 2 to 50 parts by weight, and more preferably 5 to 20 parts by weight with respect to 100 parts by weight of the binder.

After forming the release layer 22 on the surface of the carrier sheet 30, as shown in FIG. 2A, an electrode layer 12a to compose an internal electrode layer 12 after firing is formed to be a predetermined pattern on the surface of the release layer 22. A thickness of the electrode layer 12a is preferably 0.1 to 5 μm, and more preferably 0.1 to 1.5 μm or so. The electrode layer 12a may be configured by a single layer or two or more layers having different compositions.

The electrode layer 12a can be formed on the surface of the release layer 22 by a thick film formation method, such as a printing method using an electrode paste, or a thin film method, such as evaporation and sputtering. When forming the electrode layer 12a on the surface of the release layer 22 by a screen printing method or a gravure printing method as a kind of thick film method, it is as below.

First, an electrode paste is prepared. The electrode paste is fabricated by kneading a electrode material powders composed of a variety of conductive metals and alloys, or a variety of oxides, organic metal compounds or resinates, etc. to be conductive materials after firing with an organic vehicle.

As a conductive material (electrode material powder) to be used when producing an electrode paste, Ni, a Ni alloy, furthermore, a mixture of these are used. A shape of such a conductive material is not particularly limited and may be a spherical shape and scale-like shape, etc. or a mixture of these shapes. In the case of a spherical shape, normally those having an average particle diameter of the conductive material of normally 0.01 to 2 μm, and preferably 0.05 to 0.5 μm or so may be used.

An organic vehicle contains a binder and a solvent. As the binder, for example, ethyl cellulose, an acrylic resin, polyvinyl butyral, polyvinyl acetal, polyvinyl alcohol, polyolefin, polyurethane, polystyrene, or a copolymer of these may be mentioned. In the present embodiment, particularly, butyral based resins, such as a polyvinyl butyral resin and/or a polyvinyl acetal resin, are preferable.

A binder resin is contained preferably by 2.5 to 5.5 parts by weight with respect to 100 parts by weight of a conductive material (electrode material powder) in the electrode paste. In the electrode paste, the same ceramic powder (inhibitor for sintering electrode) as the ceramic powder may be contained in the green sheet paste. In that case, the binder resin is contained in the electrode paste by preferably 2.5 to 5.5 parts by weight with respect to 100 parts by weight of a total weight of a conductive material (electrode material powder) and ceramic powder (inhibitor for sintering electrode). When the binder resin is too little, the strength declines and breaking of an electrode layer 12a and other trouble tend to arise in the dry transfer method, while when the binder resin is too much, the metal filling density of the electrode layer 12a before firing declines, and it tends to become difficult to maintain smoothness of the internal electrode layer 12 after firing.

Preferably, dielectric material powder is contained by 50 wt % or less with respect to the entire internal electrode paste. For example, by lowering the content of the electrode material powder from 50 wt % to 45 wt %, as far as an adhering amount as a paste is same, a thickness of the internal electrode layer 12a can be made less by about 10% or so, which contributes to make the layer thinner.

Viscosity of an electrode paste composition measured by using an RV20 type cone disc viscometer made by HAAKE when giving rotation of obtaining a shear rate of 8[1/s] at 25° C. is 4 Pa·s or more, and preferably 6 Pa·s or more. When the viscosity at a low share rate is low, blur is easily caused when printed.

When the ratio of a solvent is made high to lower the content of the electrode material powder in the internal electrode paste, viscosity of the paste declines and blur and other problems are easily caused when printing by using the paste. To maintain necessary viscosity while keeping the binder resin amount constant by making the solvent ratio high, it is effective to use a resin having high viscosity.

In the present embodiment, as a binder resin for an internal electrode paste, a polyvinyl butyral resin and/or a polyvinyl acetal resin is used. There are a variety of grades in these resins. In the present embodiment, by selecting a polyvinyl butyral resin and/or polyvinyl acetal resin having a polymerization degree of 1400 or more, it is possible to maintain necessary viscosity even when the solvent ratio is made high. Note that a polymerization degree of a generally produced polyvinyl butyral resin and/or polyvinyl acetal resin is 3600 or less. Accordingly, a polymerization degree of the polyvinyl butyral resin and/or polyvinyl acetal resin is preferably 1400 to 3600 in the binder resin for the internal electrode paste. In the present embodiment, polyvinyl acetal is preferable, and those having an acetalization degree of 74 mol % or less are preferable.

As a solvent, any of those well-known, for example, terpineol, dihydro terpineol, butylcarbitol and kerosene, etc. may be used. A solvent content is preferably 20 to 50 wt % or so with respect to the entire paste.

To improve the adhesiveness, the electrode paste preferably contains a plasticizer. As a plasticizer, benzylbutyl phthalate (BBP) and other phthalate esters, adipic acids, phosphoric esters and glycols, etc. may be mentioned. In the present embodiment, preferably, dioctyl adipic acid (DOA), butyl phthalate butylene glycol (BPBG), didodecyl phthalate (DDP), dibutyl phthalate (DBP), benzylbutyl phthalate (BBP), dioctyl phthalate (DOP), and dibutyl sebacate, etc. are used. Among them, dioctyl phthalate (DOP) is particularly preferable.

The plasticizer is contained by preferably 25 parts by weight or more and 150 parts by weight or less, and more preferably 25 to 100 parts by weight with respect to 100 parts by weight of a binder resin. By adding a plasticizer, an adhesive force of an electrode layer 12a formed by using the paste is improved, and an adhesive force of the electrode layer 12a and a green sheet 10a improves. To obtain the effect, an adding quantity of the plasticizer is preferably 25 parts by weight or more. Note that when the adding quantity exceeds 150 parts by weight, an excessive plasticizer exudes from the electrode layer 12a formed by using the paste, which is not preferable.

After or before forming an electrode paste layer in a predetermined pattern on a surface of the release layer 22 by the printing method, a blank pattern layer 24 having substantially the same thickness as that of the electrode layer 12a is formed on the surface of the release layer 22 not formed with the electrode layer 12a. The blank pattern layer 24 is formed by the same method by using the same paste as that for forming the green sheet 10a show in FIG. 3A except for what explained below.

A dielectric paste for forming the blank pattern layer contains a binder, a plasticizer and a release agent as an optional component in addition to dielectric particles. A particle diameter of dielectric particles may be the same as or different from that of the dielectric particles contained in a ceramic green sheet.

As a binder, for example, an acrylic resin, polyvinyl butyral, polyvinyl acetal, polyvinyl alcohol, polyolefin, polyurethane, polystyrene or emulsion of these may be used.

The binder contained in a dielectric paste for forming the blank pattern layer may be the same as or different from a binder contained in the ceramic green sheet. Also, the binder contained in the dielectric layer paste for forming the blank pattern layer may be the same as or different from that in the electrode paste, but preferably, the same binder is used.

A plasticizer contained in the dielectric paste for forming the blank pattern layer is not particularly limited and, for example, phthalate esters, adipic acids, phosphoric esters, and glycols, etc. may be mentioned. A plasticizer contained in the dielectric paste for forming the blank pattern layer may be the same as or different from the plasticizer contained in the ceramic green sheet.

The dielectric paste for forming the blank pattern layer contains a plasticizer by about 0 parts by weight to about 200 parts by weight, preferably about 20 parts by weight to 200 parts by weight, and more preferably about 50 parts by weight to about 100 parts by weight with respect to 100 parts by weight of the binder.

A release agent contained in the dielectric paste for forming the blank pattern layer is not particularly limited and, for example, paraffin, wax and silicone oil, etc. may be mentioned.

The dielectric paste for forming the blank pattern layer contains a release agent by about 0 parts by weight to about 100 parts by weight, preferably about 2 parts by weight to 50 parts by weight, and more preferably about 5 parts by weight to about 20 parts by weight with respect to 100 parts by weight of the binder.

Viscosity of a paste for the blank pattern paste measured by using an RV20 type cone disc viscometer made by HAAKE when giving rotation of obtaining a shear rate of 8[1/s] at 25° C. is 4 Pa·s or more, and preferably 7 Pa·s or more. When the viscosity at a low share rate is low, blur is easily caused when printed.

The blank pattern paste is printed on a blank pattern portion between electrode layers 12a as shown in FIG. 2A. After that, the electrode layer 12a and the blank pattern layer 24 are dried in accordance with need. The drying temperature of the electrode layer 12a and the blank pattern layer 24 is not particularly limited and is preferably 70 to 120° C., and drying time is preferably 1 to 10 minutes.

(3) As shown in FIG. 2A, an adhesive layer transfer sheet formed with an adhesive layer 28 is prepared on the surface of a carrier sheet 26 as a third supporting sheet separately from the carrier sheets 20 and 30 explained above. The carrier sheet 26 is formed by the same sheet as that of the carrier sheets 20 and 30.

The adhesive layer includes a binder and a plasticizer. The adhesive layer 28 may contain the same dielectric particle as that of the dielectrics composing the green sheet 10a, however, in the case of forming an adhesive layer having a thinner thickness than a particle diameter of the dielectric particles, it is better not to contain dielectric particles. Also, when dielectric particles are contained in the adhesive layer 28, a particle diameter of the dielectric particles is preferably smaller than the particle diameter of the dielectric particles contained in the green sheet.

A plasticizer is preferably contained in the adhesive layer 28 by 0 to 200 parts by weight, preferably 20 to 200 parts by weight, and more preferably 50 to 100 parts by weight with respect to 100 parts by weight of the binder.

A thickness of the adhesive layer 28 is preferably 0.02 to 0.3 μm or so, more preferably, thinner than an average particle diameter of dielectric particles contained in the green sheet. Also, a thickness of the adhesive layer 28 is preferably 1/10 or less of a thickness of the green sheet 10a.

When a thickness of the adhesive layer 28 is too thin, the adhesive force declines, while when too thick, a space is easily formed inside an element body after sintering depending on the thickness of the adhesive layer, and a capacitance by an amount of the volume tends to decrease remarkably.

The adhesive layer 28 is formed on the surface of the carrier sheet 26 as a third supporting sheet, for example, by a bar coater method, die coater method, reverse coater method, -dip coater method and kiss coater method, etc. and dried in accordance with need. The drying temperature is not particularly limited, but is preferably the room temperature to 80° C., and the drying time is preferably 1 to 5 minutes.

Figure 2B:
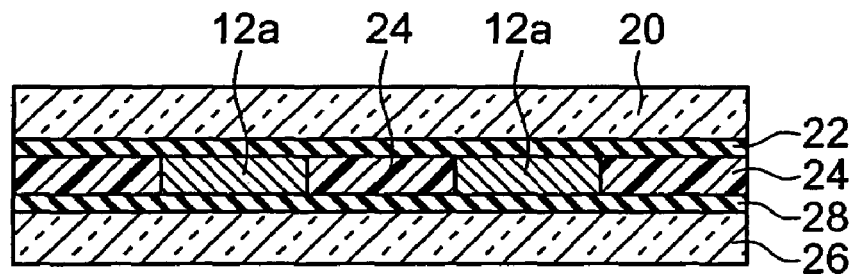
Figure 2C:
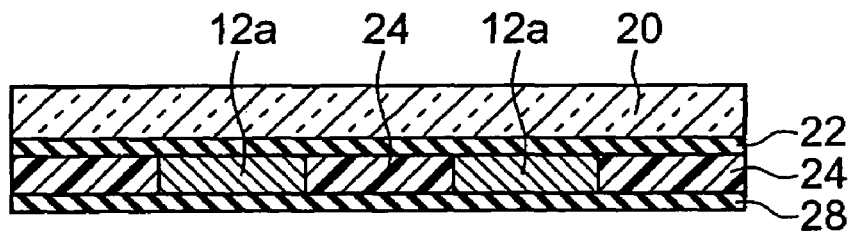

(4) To form the adhesive layer on the surface of the electrode layer 12a and the blank pattern layer 24 shown in FIG. 2A, a transfer method is applied in the present embodiment. Namely, as shown in FIG. 2B, the adhesive layer 28 of the carrier sheet 26 is pressed against the surface of the electrode layer 12a and the blank pattern layer 24, heated and pressed, then, the carrier sheet 26 is removed. Consequently, as shown in FIG. 2C, the adhesive layer 28 is transferred to the surface of the electrode layer 12a and the blank pattern layer 24. Note that transfer of the adhesive layer 28 may be performed on the surface of the green sheet 10a shown in FIG. 3A.

The heating temperature at transferring is preferably 40 to 100° C., and the pressing force is preferably 0.2 to 15 MPa. Pressing may be performed by a press or a calendar roll, but is preferably performed by a pair of rolls.

Figure 3B:
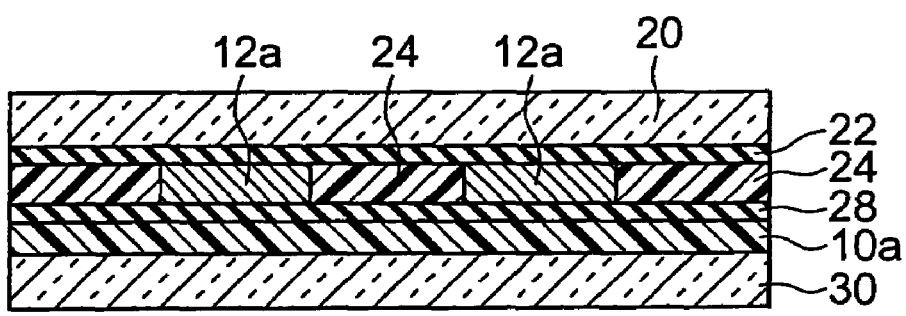
Figure 3C:
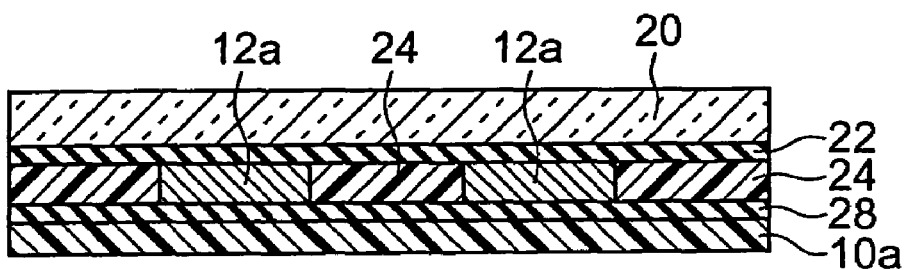

After that, the electrode layer 12a is adhered to the surface of the green sheet 10a formed on the surface of the carrier sheet 30 shown in FIG. 3A. For that purpose, as shown in FIG. 3B, the electrode layer 12a and the blank pattern layer 24 of the carrier sheet 20 are pressed via adhesive layer 28 against the surface of the green sheet 10a together with the carrier sheet 20, heated and pressed. As a result, as shown in FIG. 3C, the electrode layer 12a and the blank pattern layer 24 are transferred to the surface of the green sheet 10a. Note that since the carrier sheet 30 on the green sheet side is peeled off, when seeing from the green sheet 10a side, the green sheet 10a is transferred to the electrode layer 12a and the blank pattern layer 24 via the adhesive layer 28.

Heating and pressing at the time of transferring may be pressing and heating by a press or by a calendar roll, but is preferably performed by a pair of rolls. The heating temperature and the pressing force are same as those at the time of transferring the adhesive layer 28.

A single-layer electrode layer 12a in a predetermined pattern is formed on the single green sheet 10a by steps shown in FIG. 2A to FIG. 3C. A green sheet 10a formed with the electrode layer 12a is stacked by repeating the steps shown in FIG. 4A to FIG. 6C. Note that the same reference numbers are given to common members with those shown in FIG. 3A to FIG. 4C, and an explanation thereon is partially omitted.

Figure 4A:
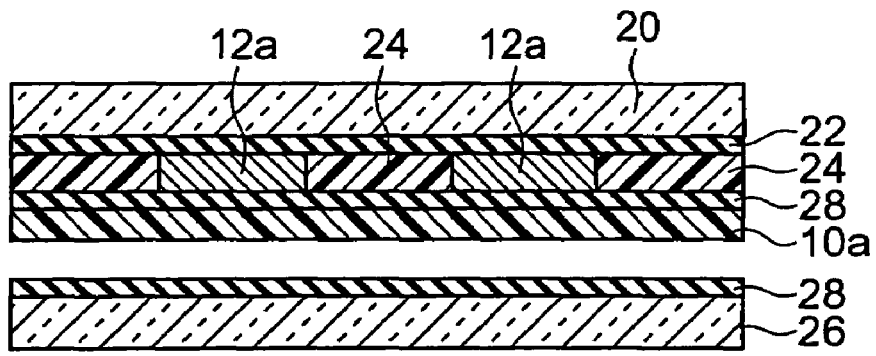
Figure 4B:
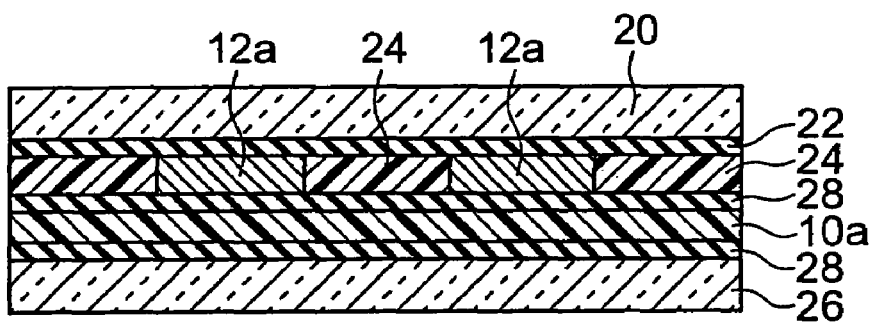
Figure 4C:
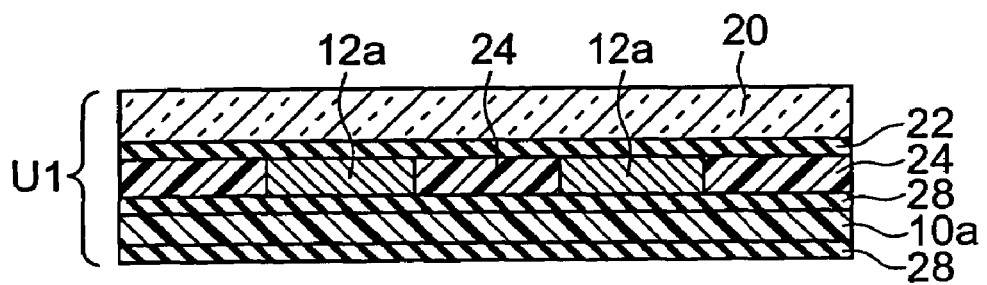
Figure 5A:
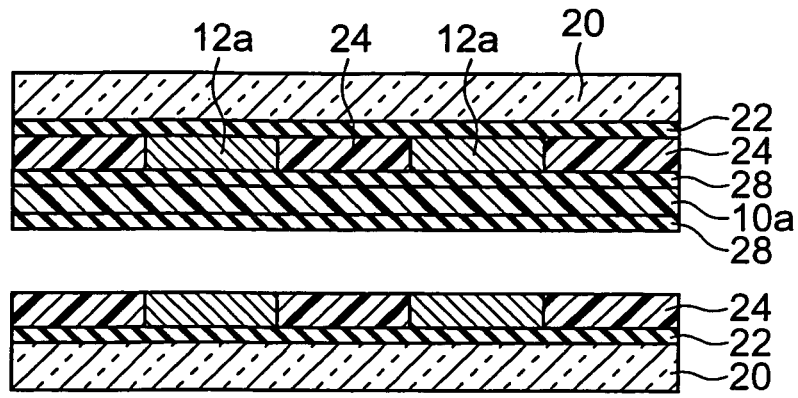

First, as shown in FIG. 4A to FIG. 4C, the adhesive layer 28 is transferred to the surface on the other side of the electrode layer (back side) on the green sheet 10a. After that, as shown in FIG. 5A to FIG. 5C, the electrode layer 12a and the blank pattern layer 24 are transferred to the back side of the green sheet 10a via the adhesive layer 28.

Figure 6A:
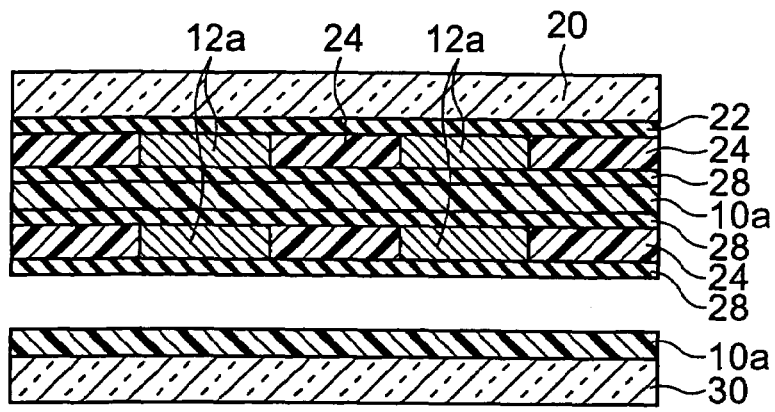
Figure 6B:
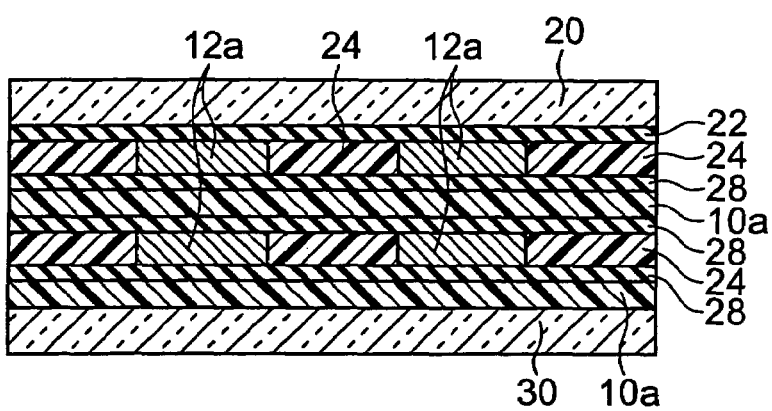
Figure 6C:
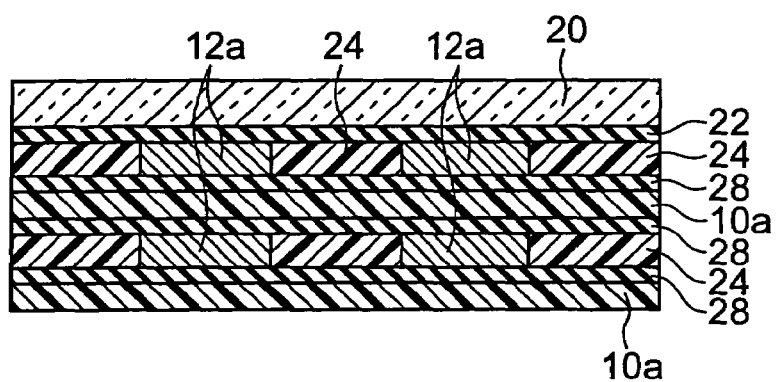
Figure 7:
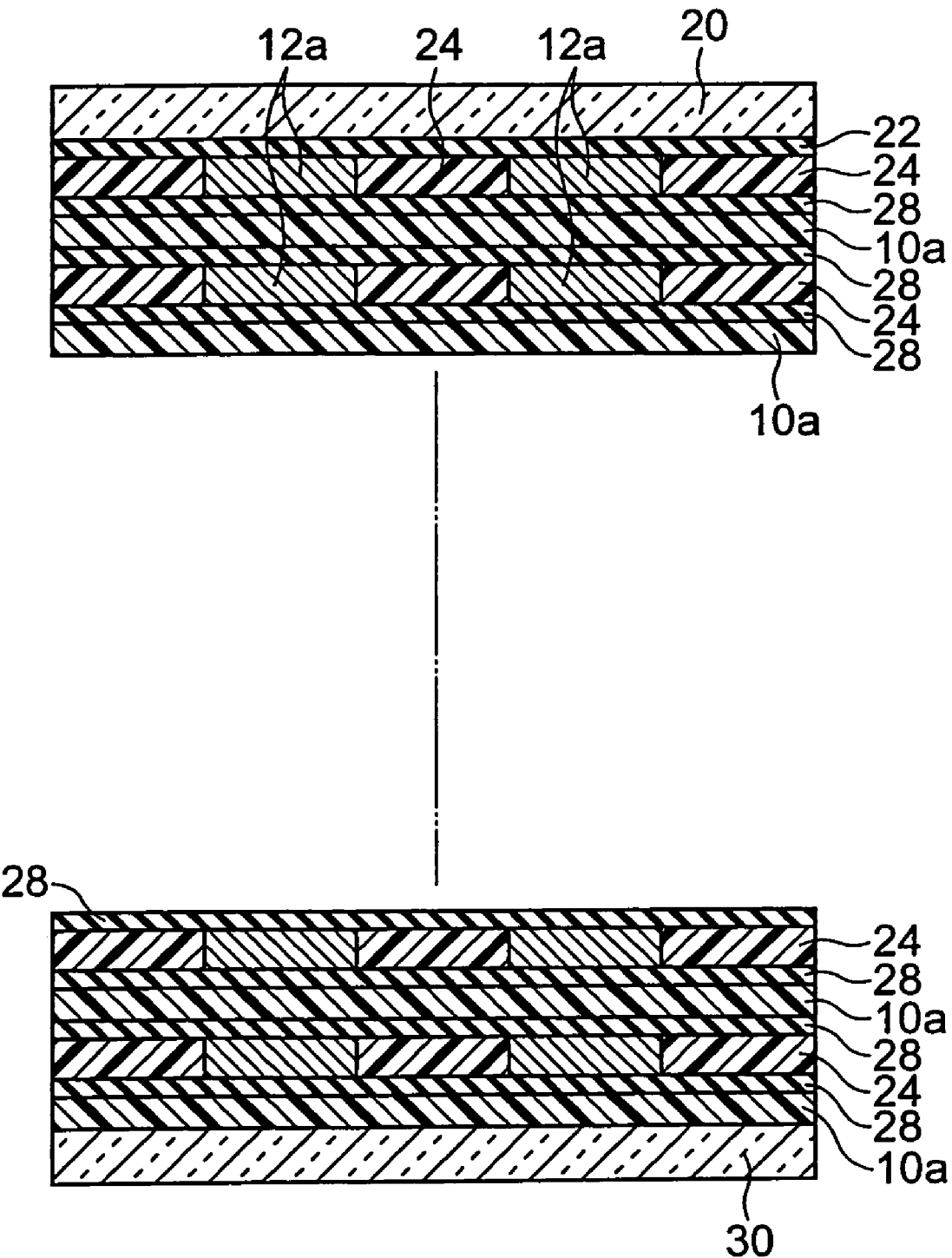

Next, as shown in FIG. 6A to FIG. 6C, on the surface of the electrode layer 12a and the blank pattern layer 24, the green sheet 10a is transferred via the adhesive layer 28. After that, by repeating the transfer, a multilayer block, wherein a large number of electrode layers 12a and the green sheet 10a are alternately stacked as shown in FIG. 7, is obtained.

Figure 5B:
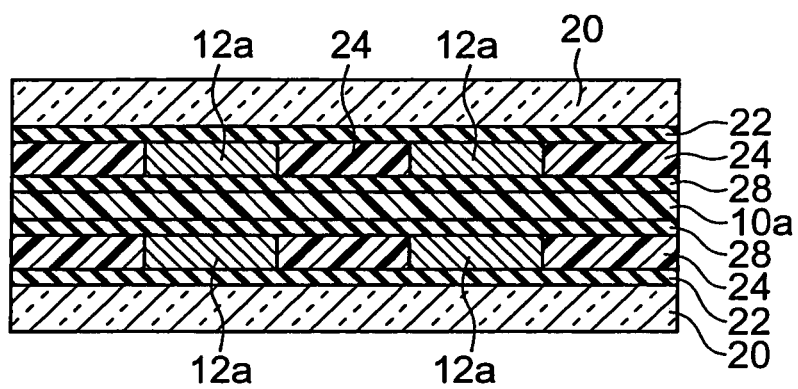
Figure 5C:
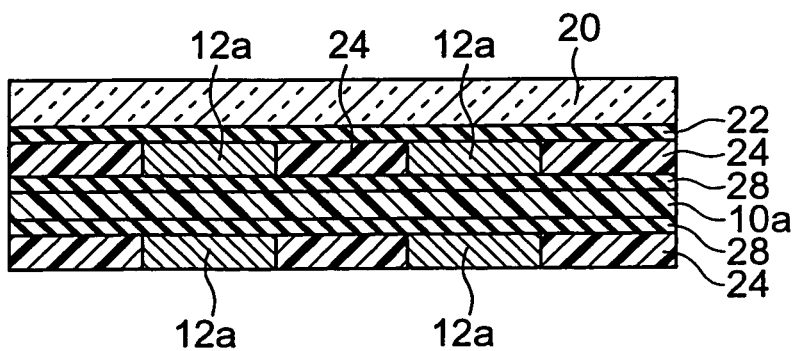

Note that without applying the steps shown in FIG. 5C to FIG. 6C, that is, from the step shown in FIG. 5B, not to remove the carrier sheet 20 on the lower side but to remove the carrier sheet on the upper side, and a multilayer unit U1 shown in FIG. 4C may be stacked thereon. After that, by repeating an operation of removing the carrier sheet 20 on the upper side again, stacking thereon the multilayer unit U1 shown in FIG. 4C, and removing the carrier sheet 20 on the upper side, a multilayer block wherein a large number of electrode layers 12a and the green sheet 10a are alternately stacked as shown in FIG. 7 is obtained. A method of stacking the multilayer unit U1 shown in FIG. 4C is superior in terms of an efficiency of the stacking operation.

When the number of stacking layers of the green sheet is small, a firing step in the next step is performed by the multilayer block alone. Also, in accordance with need, a plurality of multilayer blocks as such may be stacked via adhesive layers 28 formed by a transfer method in the same way as above to obtain a multilayer body having larger number of layers.

(5) After that, as shown in FIG. 8, a green sheet 40 for an outer layer (a thick multilayer body obtained by stacking a plurality of green sheets not formed with an electrode layer) is stacked on the lower surface of the stacked body and the entire stacked body is supported by an absorption holder 50. After that, the carrier sheet 20 on the upper side is peeled off, the green sheet 40 for an outer layer is formed on top of the multilayer body in the same way, and final pressing is performed.

Pressure at the time of the final pressing is preferably 10 to 200 MPa. Also, the heating temperature is preferably 40 to 100° C. After that, the multilayer body is cut to be a predetermined size to form green chips. The green chips are subjected to binder removal processing and firing processing, then, thermal treatment is performed in order to re-oxidize the dielectric layer.

The binder burn-out processing may be performed under a normal condition, but when using a base metal, such as Ni and a Ni alloy, as a conductive material of the internal electrode layer, it is preferably performed under the specific condition below.

temperature rising rate: 5 to 300° C./hour, particularly 10 to 50° C./hour holding temperature: 200 to 800° C., particularly 350 to 600° C.

holding time: 0.5 to 20 hours, particularly 1 to 10 hours atmosphere: a mixed gas of wet $N_2$ and $H_2$ A firing condition is preferably as below.

temperature rising rate: 50 to 500° C./hour, particularly 200 to 300° C./hour holding temperature: 1100 to 1300° C., particularly 1150 to 1250° C.

holding time: 0.5 to 8 hours, particularly 1 to 3 hours cooling rate: 50 to 500° C./hour, particularly 200 to 300° C./hour atmosphere gas: a mixed gas of wet $N_2$ and $H_2$, etc.

Note that oxygen partial pressure in an atmosphere at firing is preferably $10^{-2}$ Pa or less, particularly $10^{-2}$ to $10^{-8}$ Pa. When exceeding the above ranges, the internal electrode layer tends to oxidize, while when the oxygen partial pressure is too low, abnormal sintering is caused in an electrode material of the internal electrode layer to be broken.

The thermal treatment after performing such firing is preferably performed with a holding temperature or highest temperature of 1000° C. or higher, more preferably 1000 to 1100° C. When the holding temperature or the highest temperature at the time of the thermal treatment is lower than the above ranges, it is liable that oxidization of the dielectric material is insufficient to make the insulation resistance lifetime short, while when exceeding the above ranges, Ni in the internal electrode oxidizes and the capacity decreases, moreover, Ni reacts with a dielectric base and the lifetime also tends to become short. The oxygen partial pressure at the time of thermal treatment is higher than a higher oxygen partial pressure than a reducing atmosphere at the time of firing, preferably $10^{-3}$ Pa to 1 Pa, and more preferably $10^{-2}$ Pa to 1 Pa. When it is lower than the above range, re-oxidization of the dielectric layer 2 becomes difficult, while when exceeding the above ranges, the internal electrode layer 3 tends to oxidize. Other condition of the thermal treatment is preferably as below.

holding time: 0 to 6 hours, particularly 2 to 5 hours cooling rate: 50 to 500° C./hour, particularly 100 to 300° C./hour atmosphere gas: wet $N_2$ gas, etc.

Note that to wet a $N_2$ gas or a mixed gas, etc., for example, a wetter, etc. may be used. In this case, the water temperature is preferably 0 to 75° C. or so. Also, the binder removal processing, firing and thermal treatment may be performed continuously or separately. When performing continuously, the atmosphere is changed without cooling after the binder removal processing, continuously, the temperature is raised to the holding temperature at firing to perform firing. Next, it is cooled and the thermal treatment is preferably performed by changing the atmosphere when the temperature reaches to the holding temperature of the thermal treatment. On the other hand, when performing them separately, after raising the temperature to the holding temperature at the binder removal processing in an atmosphere of a $N_2$ gas or a wet $N_2$ gas, the atmosphere is changed, and the temperature is furthermore raised for firing. After cooling the temperature to the holding temperature at the thermal treatment, it is preferable that the cooling continues by changing the atmosphere again to a $N_2$ gas or a wet $N_2$ gas. Also, in the thermal treatment, after raising the temperature to the holding temperature under the $N_2$ gas atmosphere, the atmosphere may be changed, or the entire process of the thermal processing may be in a wet $N_2$ gas atmosphere.

The thus obtained sintered body (element body 4) is subjected to end surface polishing, for example, by barrel polishing and sand-blast, etc., then, a terminal electrode paste is burnt to form terminal electrodes 6 and 8. For example, a firing condition of the terminal electrode paste is preferably in a mixed gas of wet $N_2$ and $H_2$ at 600 to 800° C. for 10 minutes to 1 hour or so. In accordance with need, electrical plating, etc. is performed on the terminal electrodes 6 and 8 to form a pad layer. Note that the terminal electrode paste may be fabricated in the same way as the electrode paste explained above.

A multilayer ceramic capacitor of the present invention produced as above is mounted on a print substrate, etc. by soldering, etc. and used for a variety of electronic equipments.

In a method of producing a multilayer ceramic capacitor according to the present embodiment, as a green sheet, a polyvinyl acetal resin having a polymerization degree in a specific range, a butyralation degree in a specific range and a residual acetyl group amount of a predetermined value or less is used as a binder. Therefore, even an extremely thin green sheet 10a of, for example, 5 μm or less is strong enough to be peeled from the carrier sheet 30 and has preferable adhesiveness and handlability. Also, surface roughness of the sheet 10a is small and stackability is excellent. Therefore, it becomes easy to stack a large number of green sheets 10a via electrode layers 12a, and it is also possible to stack without the adhesive layers 28 in accordance with need.

Also, in a production method of a multilayer ceramic capacitor according to the present embodiment, a dry type electrode layer 12a can be easily and highly accurately transferred to the surface of the green sheet 10a without damaging or deforming the green sheet 10a.

Furthermore, in the production method of the present embodiment, the adhesive layer 28 is formed on a surface of an electrode layer or a green sheet by a transfer method, and the electrode layer 12a is adhered to the surface of the green sheet 10a via the adhesive layer 28. By forming the adhesive layer 28, at the time of transferring the electrode layer 12a to the surface of the green sheet 10a by adhering, a high pressure and heat become unnecessary and adhesion under a low pressure and low temperature becomes possible. Accordingly, even when the green sheet 10a is extremely thin, the green sheet 10a is not damaged, the electrode layer 12a and the green sheet 10a can be preferably stacked, and a short-circuiting defect, etc. is not caused.

In the present embodiment, when a binder composition is same (a polyvinyl butyral resin and/or a polyvinyl acetal resin) in the adhesive layer 28 and the electrode layer 12a, adhesiveness between the electrodes is largely improved. Therefore transfer becomes easy.

Also, for example, by making an adhesive force of the adhesive layer 28 stronger than adherence force of the release layer 22 and also making the adherence force of the release layer 22 stronger than an adhesive force between the green sheet 10a and the carrier sheet 30, the carrier sheet 30 on the green sheet 10a side can be selectively and easily removed.

Furthermore, in the present embodiment, since the adhesive layer 28 is not directly formed on the surface of the electrode layer 12a or green sheet 10a by an applying method, etc. but formed by a transfer method, components of the adhesive layer 28 do not soak in the electrode layer 12a or green sheet 10a and an extremely thin adhesive layer 28 can be formed. For example, a thickness of the adhesive layer 28 can be made as thin as 0.02 to 0.3 μm or so. Even if the thickness of the adhesive layer 28 is thin, components of the adhesive layer 28 do not soak in the electrode layer 12a or green sheet 10a, so that the adhesive force is sufficient. Moreover, an adverse effect is not given to a composition of the electrode layer 12a or green sheet 10a.

Also, in the present embodiment, when forming a blank pattern layer 24 on a blank pattern portion on the electrode layer 12a shown in FIG. 2A, viscosity of the blank pattern paste is not extremely declined, and preferable printing becomes possible even in the case of an extremely thin blank pattern layer. Also, it is not necessary to increase an amount of a binder resin included in the blank pattern paste, delamination, etc. between sheets are not caused at the time of binder removal of a stacked body.

Particularly, in the present embodiment, a polyvinyl butyral resin and/or a polyvinyl acetal resin is included in the internal electrode paste, an internal electrode layer 12a formed by the paste has high strength and a high adhesive force, and transfer of an adhesive layer 28 is relatively easy. Also, when removing a carrier sheet 20 made by a PET film as a supporting sheet, breaking of the internal electrode layer 12a is hard to be caused.

Note that the present invention is not limited to the above embodiments and may be variously modified within the scope of the present invention.

For example, a method of the present invention is not limited to the production method of multilayer ceramic capacitors and may be applied as a production method of other multilayer type electronic devices, such as multilayer inductors, multilayer substrates.

EXAMPLES

Below, the present invention will be explained based on further detailed examples, but the present invention is not limited to the examples.

Example 1a

Production of Green Sheet Paste

As a starting material of ceramic powder, $BaTiO_3$ powder (BT-02 made by Sakai Chemical Industry Co., Ltd.) was used. A ceramic powder subcomponent additives were prepared to satisfy $(Ba_{0.6}Ca_{0.4})SiO_3$: 1.48 parts by weight, $Y_2O_3$: 1.01 parts by weight, $MgCO_3$: 0.72 parts by weight, $Cr_2O_3$: 0.13 parts by weight and $V_2O_5$: 0.045 parts by weight with respect to 100 parts by weight of the $BaTiO_3$ powder.

First, only the subcomponents were mixed by a ball-mill to obtain slurry. Namely, the subcomponent additives (total amount 8.8 g) and a solvent (16 g), wherein ethanol/n-propanol is 1:1, were preliminary ground by a ball-mill for 20 hours. Next, the preliminary ground slurry of the subcomponent additives, ethanol: 38 g, n-propanol: 38 g, xylene: 28 g, mineral spirit: 14 g, DOP (dioctyl phthalate) as a plasticizer component: 6 g and a polyethylene glycol based nonionic dispersant (HLB=5 to 6) as a dispersant: 1.4 g were added to $BaTiO_3$: 191.2 g and mixed by a ball-mill for 4 hours. Note that a block polymer of polyethylene glycol and fatty ester was used as the polyethylene glycol based nonionic dispersant (HLB=5 to 6) as a dispersant.

The lacqur was-prepared as follow; 15 wt % of BH6 (polyvinyl butyral resin: PVB made by Sekisui Chemical Co., Ltd.) was dissolved in etharol/n-propanol-1/1 solvent system. 80 g of the lacqur was added to the dispersed paste. After that, by ball-milling, a ceramic paste (for green sheet) was obtained.

A polymerization degree of a polyvinyl butyral resin as the binder resin was 1400, a butyralation degree thereof was 69 mol % ±3 mol %, and a residual acetyl group amount thereof was 3±2 mol %. The binder resin was contained by 6 parts by weight in the ceramic paste with respect to 100 parts by weight of ceramic powder (including ceramic powder subcomponent additives). Also, when assuming that total volume of the ceramic powder, binder resin and plasticizer in the ceramic paste was 100 volume %, the volume ratio accounted by the ceramics powder was 67.31 volume %.

Also, DOP as a plasticizer was contained in the ceramic paste by 50 parts by weight with respect to 100 parts by weight of the binder resin. Water was contained by 2 parts by weight with respect to 100 parts by weight of the ceramic powder. The polyethylene glycol based nonionic dispersant as a dispersant was contained by 0.7 part by weight with respect to 100 parts by weight of the ceramic powder.

Also, in the paste, mineral spirit of at least any one of a hydrocarbon based solvent, industrial gasoline, kerosene and solvent naphtha was added by 5 parts by weight with respect to 100 parts by weight of the ceramic powder. Furthermore, the paste contains-an alcohol based solvent and an aromatic solvent. When assuming that total weight of the alcohol based solvent and aromatic solvent was 100 parts by weight, toluene as an aromatic solvent was contained by 15 parts by weight.

Viscosity of the paste was 0.12 Pa·s. The viscosity of the paste was measured by using a Brookfield-type viscosimeter when giving rotation of 50 rpm at 25°.

Production of Green Sheet

The paste obtained as above was applied to a PET film as a second supporting film shown in FIG. 3A to be a thickness of 5 μm by a wire bar coater and dried to produce a green sheet 10a. The applying rate was 50 m/min. and the drying condition was a temperature in the drying furnace of 60° C. to 70° C. and drying time of 2 minutes.

Release Layer Paste

A release layer paste obtained by diluting the above dielectric green sheet paste by two times in a weight ratio with ethanol/toluene (55/10). Note that in the release layer, DOP as a plasticizer was contained by 50 parts by weight in a ceramic paste with respect to 100 parts by weight of a binder resin.

Adhesive Paste

An adhesive paste was obtained by dissolving 15 wt % of polyvinyl butyral resin into MEK (methylethyl ketone). Additionally, 50-part-by-weight plasticizer DOP was added to an adhesive paste, with respect to 100 parts by weight of dissolved PVB resin.

Internal Electrode Paste (Electrode Paste to be Transferred)

Next, an internal electrode paste was obtained by making slurry by kneading by a ball mill at a composition ratio as shown below. Namely, with respect to 100 parts by weight of Ni particles (electrode material powder) having an average particle diameter of 0.2 μm, 20 parts by weight of the same ceramic powder (BaTiO$_3$ powder and a ceramic powder subcomponent additives) as ceramic powder contained in the green sheet paste, 4.5 parts by weight of a polyvinyl butyral resin and 95 parts by weight or terpineol were added and kneaded by a ball mill to make slurry, so that an internal electrode paste was obtained.

Ni particles as electrode material powder was contained by 47 wt %, which is less than 50 wt %, with respect to the entire internal electrode paste. As a polyvinyl acetal resin as a binder resin, those having a polymerization degree of 2400 and an acetalization degree of 55 mol % were used. The polyvinyl butyral resin is contained by 3.8 parts by weight, which is in a range of 2.5 to 5.5 parts by weight with respect to a total of 100 parts by weight of the Ni powder and ceramic powder. Viscosity of the electrode paste composition measured by using an RV20 type cone disc viscometer made by HAAKE at a shear rate of 8[1/s] at 25° C. was 6 Pa·s.

Blank Pattern Paste

A blank pattern paste was produced in the same way as producing an internal electrode paste. As a binder resin, a polyvinyl butyral resin having a polymerization degree of 1450, a butyralation degree of 69 mol % ±3 mol %, and a residual acetyl group amount of 6±2 mol % was used.

Viscosity of the blank paste composition measured by using an RV20 type cone disc viscometer made by HAAKE at a shear rate of 8[1/s] at 25° C. was 7 Pa·s. Also, the paste contained ceramic powder by a ratio of 40 wt % with respect to the entire paste.

Formation of Release Layer and Transfer of Adhesive Layer and Electrode Layer

First, to form a release layer, the above release layer paste was applied to a PET film (first supporting sheet) by a wire bar coater and dried to form 0.3 μm of a release layer.

On the surface of the release layer, the electrode layer 12a and the blank pattern layer 24 were formed. The electrode layer 12a was formed to be a thickness of 1 μm by the printing method by using the above internal electrode paste. The blank pattern layer 24 was formed to be a thickness of 1 μm by the printing method by using the above blank pattern paste. At the time of printing by using the blank pattern paste, a problem that the paste flows out from a mesh of a print plate making, etc. were not observed.

Also, an adhesive-layer 28 was formed on another PET film (third supporting sheet). The adhesive layer 28 was formed to be a thickness of 0.1 μm by a wire bar coater by using the above adhesive layer paste.

First, on the surface of the electrode layer 12a and the blank pattern layer 24, the adhesive layer 28 was transferred by a method shown in FIG. 2. At the time of transferring, a pair of rolls were used, the pressure force was 1 MPa, and the temperature was 80° C., and it was confirmed that the transfer was preferably performed.

Next, by a method shown in FIG. 3, an internal electrode layer 12a and blank pattern layer 24 were adhered (transferred) to a surface of the green sheet 10a via the adhesive layer 28. At the time of transferring, a pair of rolls were used, the pressure force was 1 MPa, and the temperature was 80° C., and it was confirmed that the transfer was preferably performed.

Adhesive forces of the electrode layer 12a and the green sheet 10a were measured in a state shown in FIG. 3B. The adhesive force was measured by respectively releasing the supporting sheets 20 and 30, then, fixing both released surfaces to jigs by using a two-sided tape, respectively, and pulling the jigs up vertically with respect to the adhering surface at a rate of 8 mm/minute, and the maximum stress at the time was considered as an adhesive force. As shown in Table 1, the adhesive force was 30 N/cm$^2$ or more and it was confirmed that a strong adhesive force could be obtained. Note that an adhesive force of 30 N/cm$^2$ or more could not be measured, because of a measurement limit of the measuring jig.

Also, when the carrier sheet 20 made by a PET film was peeled in a state shown in FIG. 3B, the electrode layer 12a was not adhered to the sheet 20 side and it was clearly peeled off. Namely, as shown in Table 1, there was no problem on the release property (PET release property) of the carrier sheet, as well.

Table 1

TABLE 1

Adhesiveness Depending on Electrode Resin Kind and Plasticizer Addition

| Resin | | Plasticizer (PHR) | Adhesive Force(N/cm2) | PET Release Property※※ | PET Release Strength(mN/cm) | |
|---|---|---|---|---|---|---|
| | | | | | Release Layer Side | Dielectric Layer Side |
| Ethyl Cellulose | Comparative Example 1a | 0 | 0 | — | — | — |
| | Comparative Example 1b | 50 | 0 | — | — | — |
| | Comparative Example 1c | 100 | 0 | — | — | — |
| | Comparative Example 1d | 150 | 5 | X(PET, residual) | — | — |
| Butyral | Example 1a | 0 | >30·※ | ○ | 32.2 | 3.6 |
| | Example 1b | 25 | >30·※ | ○ | 29.3 | 2.0 |
| | Example 1c | 50 | >30·※ | ○ | 28.0 | 2.0 |
| | Example 1d | 75 | >30·※ | ○ | 27.3 | 2.6 |
| | Example 1e | 100 | >30·※ | ○ | 28.0 | 2.6 |

※30 N/cm2 was a measuring limit
※※"○" when no problem is caused by PET release after transfer Examples 1b to 1e Other than adding dioctyl phthalate (DOP) as a plasticizer by an adding quantity of 25, 50, 75 and 100 parts by weight to the internal electrode paste with respect to 100 parts by weight of a binder resin, internal electrode pastes were fabricated in the same way as in the example 1a, stacked bodies as shown in FIG. 3B were produced, and the same test was conducted. The results are shown in Table 1.

Also, release strength of the carrier sheets 20 and 30 was measured on the stacked bodies as shown in FIG. 3B. The results are shown in Table 1 and FIG. 10.

Measurement of release strength was obtained by pulling up one end of the carrier sheet 20 in the direction of 90-degree with respect to the plane of the stacked body at a rate of 8 mm/minute, for example, in a state shown in FIG. 3B, and measuring a force (mN/cm) acting on the carrier sheet 20 at the time as the release strength. Since the carrier sheet 20 positions on the release layer 22 side, in Table 1 and FIG. 10, the release strength of the carrier sheet 20 is indicated as release strength of PET on the release layer side. Also, in the same way, release strength of the carrier sheet 30 is indicated as release strength of PET on the dielectric layer side in Table 1 and FIG. 10.

Figure 10:
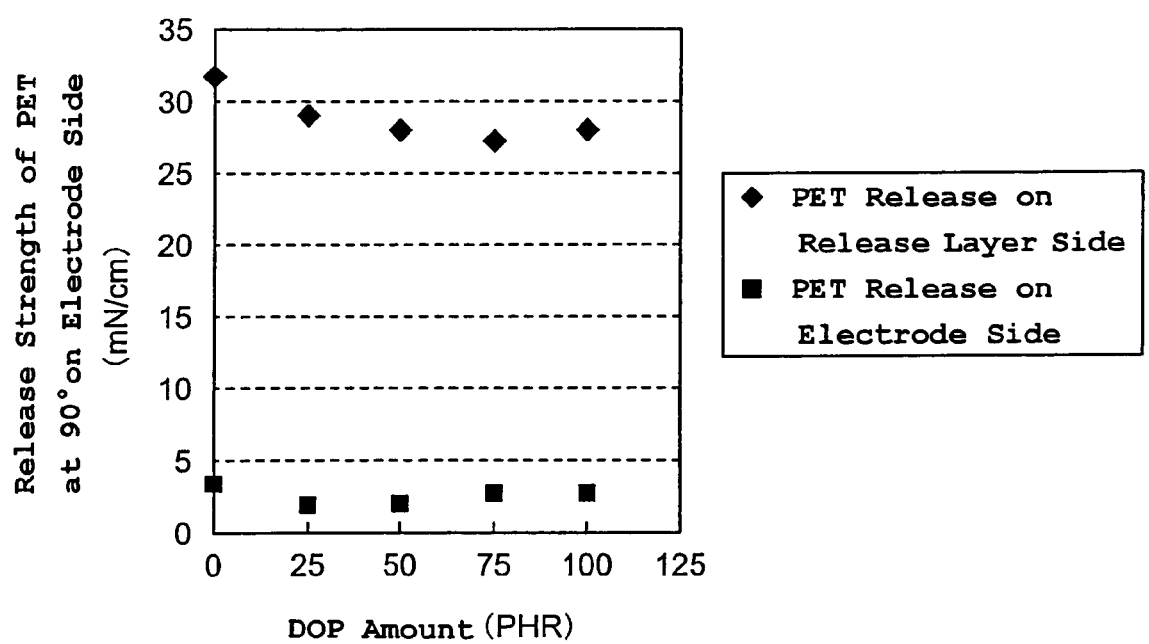
FIG. 10 is a graph showing relationship of an adding quantity of a plasticizer and release strength of a supporting sheet in the examples of the present invention.

As shown in Table 1 and FIG. 10, the release strength of PET on the release layer side was confirmed to be lowered by increasing the adding ratio PHR (Part Handred of Resin) of DOP. Also, it was confirmed that residual of breaking of the electrode layer 12a is not adhered to the surface of the carrier sheet 20 after releasing and preferable releasing was possible.

When releasing the carrier sheets 20 and 30 made by a PET film after dry transfer, if the release strength is too high, breaking of the electrode layer 12a and breaking of the adhesive layer 28 are brought. In the electrode layer of the present embodiment containing a polyvinyl butyral resin, it was confirmed that the release strength could be lowered by being added with a plasticizer, such as DOP, as shown in Table 1 and FIG. 10. Namely, the release strength can be lowered to an extent of not causing a trouble by adding a plasticizer of 25 PHR or more.

Comparative Examples 1a to 1d

Other than using an ethyl cellulose resin instead of a polyvinyl butyral resin as a binder resin of the internal electrode paste, and changing an adding quantity (PHR) of DOP as a plasticizer in a range of 0 to 150 parts by weight with respect to 100 parts by weight of the binder resin, internal electrode pastes were fabricated in the same way as in the example 1b, stacked bodies as shown in FIG. 3B was produced, and the same test was conducted. The results are shown in Table 1.

As shown in Table 1, when using an ethyl cellulose resin, the adhesive force was not improved even if a plasticizer was added, so that superiority of a polyvinyl butyral resin was confirmed.

Note that in Table 1, the adhesive force was 0 in the comparative examples 1a to 1c, so that the release property could not be evaluated; and the adhesive force of the comparative example 1d was very low, so that the carrier sheet 20 could not be released and measurement could not be made.

Examples 2a to 2k

As shown in Table 2, other than using a polyvinyl butyral resin or a polyvinyl acetal resin as a binder resin of the internal electrode paste, changing a polymerization degree, butyralation degree or acetalization degree thereof, and making an adding quantity (metal content) of the Ni particles to 45 wt % with respect to the entire electrode paste, internal electrode pastes were fabricated in the same way as in the example 1a.

Results of measuring 8% TPO lacquer viscosity in the respective examples and viscosity of the electrode pastes are shown in Table 2. The viscosity of the paste was measured by using an RV20 type cone disc viscometer made by HAAKE at 25° C., and viscosity (V8(1/s)) when giving rotation of obtaining a shear rate of 8[1/s], and viscosity (V50(1/s)) when giving rotation of obtaining a shear rate of 50[1/s] were measured.

Note that in Table 2, the 8% TPO lacquer viscosity means viscosity of a vehicle obtained by dissolving 8 parts by weight of a resin in 92 parts by weight of terpineol, and electrode paste viscosity means viscosity of an electrode paste obtained by compounding powder and a plasticizer, etc. at a predetermined ratio.

To form an electrode layer 12a of a predetermined pattern as shown in FIG. 2A by the printing method by using the electrode paste, the V8(1/s) viscosity of the paste is 4 Pa·s or higher, and preferably 6 Pa·s or higher. When the viscosity becomes lower than that, the paste flows out from a mesh at the time of printing and blur easily arises, so that printing becomes difficult.

From the viewpoint, a polymerization degree of a polyvinyl butyral resin and/or polyvinyl acetal resin to be used for an electrode paste is 1400 or more as shown in Table 2.

Also, dry density of the electrode pastes in the examples 2a to 2k was measured, respectively. The results are shown in Table 2. Measurement of the dry density was obtained by applying the electrode paste by an applicator having a gap of 250 μm to form a film, drying at 100° C. for 15 minutes, and calculated from a thickness and weight of a certain area. As shown in the examples 2g, 2i, 2j and 2k, when comparing at the same polymerization degree, if the acetalization degree of a polyvinyl acetal resin becomes high, it is liable that the viscosity becomes high but the dry density declines. When the dry density declines, continuity and smoothness of electrodes become deteriorated after firing, therefore, the higher,

TABLE 2

Table 2: Lacquer Viscosity and Electrode Viscosity Depending on Resin Kind

| | Resin Name | Polymerization Degree | Butyralation degree (mol %) | Acetalization Degree (mol %) | 8% TPO Lacquer Viscosity(Pa·s) | | Metal Content (wt %) | Electrode Paste Viscosity | | Viscosity Ratio | Dry Density |
| --- | --- | --- | --- | --- | --- | --- | --- | --- | --- | --- | --- |
| | | | | | V8(1/s) | V50(1/s) | | V8(1/s) | V50(1/s) | V8/V50 | (g/cm3) |
| | EC(N50) | | | | 26.3 | 18.2 | 50 | 10.7 | 7.1 | 1.5 | 5.6 |
| | | | | | | | 45 | 3.9 | 2.6 | 1.5 | 5.5 |
| Example 2a | PVB | 1000 | 69 | | 10.2 | 7.1 | 45 | 6.0 | 2.3 | 2.6 | 5.6 |
| Example 2b | PVB | 1450 | 69 | | 26.0 | 17.5 | 45 | 11.2 | 6.2 | 1.8 | 5.6 |
| Example 2c | PVB | 2400 | 69 | | 79.3 | 37.8 | 45 | 14.1 | 8.8 | 1.6 | 5.6 |
| Example 2d | PVB | 1400 | | 66 | 27.6 | 19.2 | 45 | 10.5 | 5.9 | 1.8 | 5.5 |
| Example 2d | PVB | 1700 | | 66 | 65.9 | 36.2 | 45 | 12.8 | 7.5 | 1.7 | 5.5 |
| Example 2e | PVB | 2000 | | 66 | 70.4 | 37.3 | 45 | 13.9 | 8.1 | 1.7 | 5.5 |
| Example 2g | PVB | 2400 | | 66 | 84.5 | 41.0 | 45 | 15.0 | 9.0 | 1.7 | 5.4 |
| Example 2h | PVB | 2000 | | 74 | 114.7 | 45.6 | 45 | 19.7 | 10.9 | 1.8 | 5.3 |
| Example 2i | PVB | 2400 | | 74 | 180.7 | 49.8 | 45 | 26.4 | 13.4 | 2.0 | 5.2 |

TABLE 2-continued

Table 2: Lacquer Viscosity and Electrode Viscosity Depending on Resin Kind

| | Resin Name | Polymerization Degree | Butyralation degree (mol %) | Acetalization Degree (mol %) | 8% TPO Lacquer Viscosity(Pa · s) V8(1/s) | 8% TPO Lacquer Viscosity(Pa · s) V50(1/s) | Metal Content (wt %) | Electrode Paste Viscosity V8(1/s) | Electrode Paste Viscosity V50(1/s) | Viscosity Ratio V8/V50 | Dry Density (g/cm3) |
|---|---|---|---|---|---|---|---|---|---|---|---|
| Example 2j | PVB | 2400 | | 55 | 77.4 | 38.2 | 45 | 14.9 | 7.3 | 2.0 | 5.6 |
| Example 2k | PVB | 2400 | | 63 | 80.2 | 40.5 | 45 | 15.4 | 7.7 | 2.0 | 5.6 |

Viscosity Measurement: RV20 type cone disc viscometer made by HAAKE, at 25° C., and shear rate of 8 and 50(1/S)

Comparative Example 2

As shown in Table 2, other than using an ethyl cellulose resin as a binder of the internal electrode paste, and making an adding quantity (metal content) of Ni particles to 45 wt % or 50 wt % with respect to the entire internal electrode paste, an internal electrode paste was fabricated in the same way as in the example 1a. The 8% TPO lacquer viscosity and viscosity of the electrode paste of the comparative example 2 were measured in the same way as in the examples 2a to 2k. The results are shown in Table 2.

As shown in Table 2, when lowering the metal content from 50% to 45% by solution diluting while fixing a resin amount of the ethyl cellulose based electrode paste according to the comparative example 2, the viscosity abruptly declines. A paste having this viscosity causes a trouble of blur, etc. in the conventional printing step.

When a content of the Ni particles is 50 wt %, the viscosity becomes high even in the case of an ethyl cellulose resin, and printing is possible, but it becomes difficult to make a thin layer due to the high metal content.

Examples 3a to 3i

Other than changing an adding ratio (PHP) of a polyvinyl butyral resin to 5.5 to 2.0 parts by weight as shown in Table 3 with respect to a total of 100 parts by weight of Ni particles and ceramic powder (inhibitor for sintering electrode) in the internal electrode paste, internal electrode pastes were fabricated in the same way as in the example 1a, stacked bodies as shown in FIG. 3B were produced, and whether the dry transfer was good or bad was confirmed. Also, an internal electrode paste of each of the examples was applied by an applicator having a gap of 250 μm to form a film and dried at 100° C. for 15 minutes, and the dry density was measured. Measurement of the density was calculated from a thickness and weight of a certain area. The results are shown in Table 3.

TABLE 3

Electrode Paste Dry Density When Changing Resin Amount

| | Resin Amount PHP/(Ni + Inhibitor) | Paste Dry Density (g/cm3) | Dry Transfer (good/bad) | Breaking Strength (MPa) |
|---|---|---|---|---|
| Example3a | 6.0 | 4.8 | o(Good) | 3.0 |
| Example3b | 5.5 | 5.0 | o(Good) | 2.6 |
| Example3c | 5.0 | 5.1 | o(Good) | 2.1 |
| Example3d | 4.5 | 5.2 | o(Good) | 2.0 |
| Example3e | 4.0 | 5.4 | o(Good) | 1.5 |
| Example3f | 3.5 | 5.6 | o(Good) | 1.3 |
| Example3g | 3.0 | 5.7 | o(Good) | 1.0 |
| Example3h | 2.5 | 5.9 | o(Good) | 0.8 |
| Example3i | 2.0 | 6.1 | x(Bad) | 0.5 |

As shown in Table 3, since the metal filling rate becomes high due to a decrease of a resin amount in the electrode paste, the dry density of the electrode paste improves. Note that when the resin amount is too little with respect to pigment (Ni+ceramic powder), strength of an electrode layer declines and a trouble arises in the dry transfer step, so that a resin amount of 3 PHP(Part Handred of Pigment) or more is preferable.

Namely, as shown in Table 3, when performing dry transfer in the case where an adding ratio (PHP) of a polyvinyl acetal resin is less than 2.5 PHP, when releasing a PET film as a supporting body, a trouble that the electrode layer is released while internally broken and adhered to the PET arose. It was indicated by "x" in Table 3. Examples wherein dry transfer was possible were indicated by "o" in Table 3. Note that when the adding ratio (PHP) of a polyvinyl butyral resin becomes larger than 5.5 PHP, as shown in Table 3, while dry transfer was possible, the paste dry density became 4.8 g/cm$^3$, which was less than 5.0 g/cm$^3$, and breaking of electrodes increased when stacked and fired, so that it was not preferable.

Accordingly, from the results shown in Table 3, it was confirmed that a polyvinyl butyral resin was preferably in a range of 2.5 to 5.5 parts by weight with respect to a total of 100 parts by weight of Ni particles and ceramic powder.

Also, breaking strength of an electrode layer was measured as below. Namely, as shown in FIG. 2A, at a stage before adhering an adhesive layer 28 to a surface of an electrode layer 12a formed by using each of the electrode pastes according to the examples 3d to 3i, the carrier sheet 20 was peeled and a stacked body of release layers 22 and electrode layers 12a was prepared, respectively. The electrode layer side of the each stacked body was supported by two points, a center position of the supporting points on the opposite side thereof was pressed by a rod at a rate of 8 mm/minute, and a pressure at the time that the electrode layer 12a was broken was measured, and the pressure was considered as the breaking strength (MPa).

Figure 9:
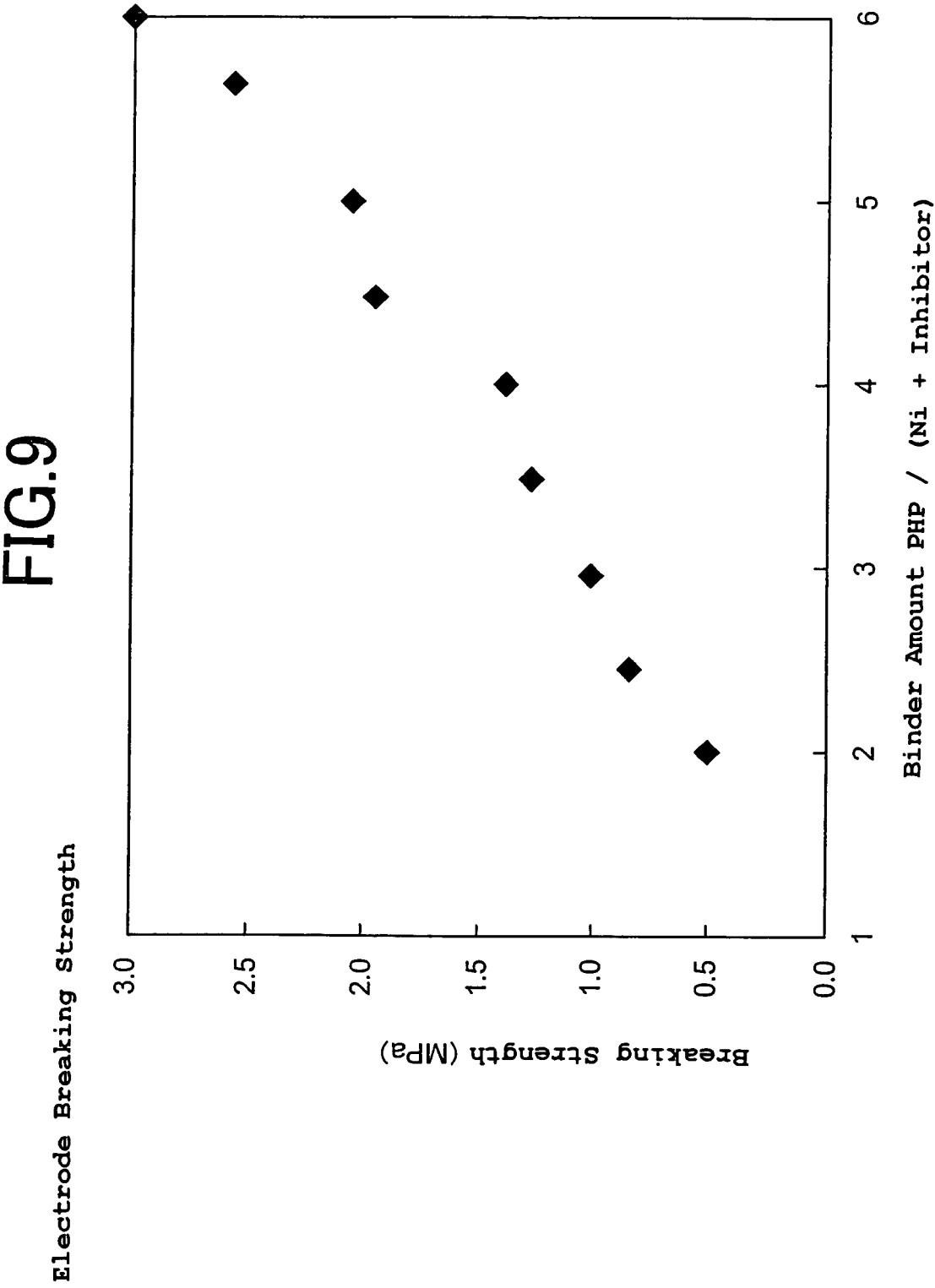
FIG. 9 is a graph showing relationship of an adding quantity of a binder resin and breaking strength of an internal electrode layer in examples of the present invention.

Relationship of an adding ratio of a polyvinyl butyral resin [binder amount PHP/(Ni+ceramic powder)] with respect to a total of 100 parts by weight of Ni particles and ceramic powder and breaking strength is shown in Table 3 and FIG. 9. As shown in Table 3 and FIG. 9, it was confirmed that as the adding ratio of the polyvinyl butyral resin increased, the breaking strength improved. An electrode, which can be dry transferred, has breaking strength of 0.8 MPa or more, and adding of a polyvinyl butyral resin by 2.5 PHP or more to the pigment is required to obtain the breaking strength of 0.8 MPa or more.

As explained above, according to the present invention, it becomes possible to provide an internal electrode paste having enough strength for the dry transfer method and adhesive force even when a thickness of the green sheet and/or electrode layer is extremely thin. As a result, it is possible to provide an internal electrode paste capable of effectively preventing delamination between sheets and deformation of a stacked body, etc. and being suitable to making an electronic device thin and multilayer, and a production method of an electronic device.

The invention claimed is:

1. An internal electrode paste, comprising electrode material powder, a binder resin containing a polyvinyl butyral resin and/or a polyvinyl acetal resin as the main component, a solvent, a plasticizer, and a ceramic powder, wherein:

said electrode material powder comprises from 40 to 50 parts by weight of the entire internal electrode paste;

a polymerization degree of said polyvinyl butyral resin and/or polyvinyl acetal resin is from 1400 to 3600;

said binder resin comprises from 2.5 to 5.5 parts by weight with respect to 100 parts by weight of said electrode material powder and ceramic powder; and said plasticizer comprises between 25 to 150 parts by weight with respect to 100 parts by weight of said binder resin.

2. The internal electrode paste as set forth in claim 1 wherein an acetalization degree of said polyvinyl acetal resin is 74 mol % or less.

3. A production method of an electronic device, comprising the steps of:

preparing the internal electrode paste as set forth in claim 2;

forming a green sheet;

forming an internal electrode layer by using said internal electrode layer paste;

stacking said green sheets via internal electrode layers to obtain a green chip; and firing said green chip.

4. A production method of an electronic device, comprising the steps of:

forming an electrode layer on a surface of a first supporting sheet by using the internal electrode paste as set forth in claim 2;

pressing said electrode layer against a surface of a green sheet and adhering said electrode layer to the surface of said green sheet;

stacking the green sheet adhered with said electrode layer to form a green chip; and firing said green chip.

5. A production method of an electronic device, comprising the steps of:

preparing the internal electrode paste as set forth in claim 1;

forming a green sheet;

forming an internal electrode layer by using said internal electrode layer paste;

stacking said green sheets via internal electrode layers to obtain a green chip;

firing said green chip.

6. A production method of an electronic device, comprising the steps of:

forming an electrode layer on a surface of a first supporting sheet by using the internal electrode paste as set forth in claim 1;

pressing said electrode layer against a surface of a green sheet and adhering said electrode layer to the surface of said green sheet;

stacking the green sheet adhered with said electrode layer to form a green chip; and firing said green chip.

\* \* \* \* \*